United States Patent [19]

Klein

[11] 4,278,048

[45] Jul. 14, 1981

[54] VETERINARY MEDICINE FACILITY

[76] Inventor: Edward J. Klein, 1000 B. Manhattan Dr., Tempe, Ariz. 85282

[21] Appl. No.: 83,578

[22] Filed: Oct. 11, 1979

[51] Int. Cl.³ .......................... A01K 1/00; A47B 81/00
[52] U.S. Cl. ........................................ 119/15; 119/19; 312/283; 312/287
[58] Field of Search ....................... 119/15, 16, 17, 19; 312/117, 283, 286, 287

[56] References Cited

U.S. PATENT DOCUMENTS

| D. 100,281 | 7/1936 | Norton | 119/19 X |
|---|---|---|---|
| 449,734 | 4/1891 | Eastman | 312/287 X |
| 2,463,658 | 3/1949 | Thrasher | 312/117 X |
| 2,584,886 | 2/1952 | Laguzzi | 312/287 X |
| 2,932,279 | 4/1960 | Giles | 119/19 X |

Primary Examiner—Gene Mancene
Assistant Examiner—Robert P. Swiatek
Attorney, Agent, or Firm—Don J. Flickinger

[57] ABSTRACT

A building structure having side walls and end walls is divided into a reception area and a treatment area by a partition extending from one of the side walls. The partition, which includes a plurality of parallel horizontal tubular members having open ends which are closeable by hingedly affixed doors, provides for temporarily holding small animals. A passageway residing between the free end of the partition and the other side wall communicates between the reception area and the treatment area.

15 Claims, 7 Drawing Figures

VETERINARY MEDICINE FACILITY

This invention relates to veterinary medicine facilities.

In a further aspect, the present invention relates to improved means for temporarily holding small animals.

More particularly, the instant invention concerns a space dividing partition having integral means for holding a plurality of small animals.

The majority of small animals, such as dogs, cats, rabbits, etc., entering veterinary medicine facilities are retained for relatively short periods of time. Many animals, requiring only routine examination or diagnosis, need be confined only on a short term rotation basis while awaiting turn. Others, needing more extensive treatment or surgery, may be kept for several hours.

Animals arriving at a veterinary medicine facility are restrained during transportation by various methods. Some are contained within specially designed travel cages. Others are tethered by collar and leash. Still others are simply carried in the arms of their owners. Means for temporarily holding small animals at the facility is, therefore, a matter of primary concern.

The prior art has provided numerous kennel and cage apparatus for the temporary confinement of small animals. A search of records within the U.S. Patent and Trademark Office was conducted to determine devices which may be relevant to the instant subject. Discovered were the following issued U.S. Patents:

No. 3,087,458, Bennett, Jr.
No. 4,002,385, Hone
No. 3,225,738, Palencia
No. 3,550,558, Sachs
No. 3,237,599, Torrey et al
No. 3,749,061, Connelly
No. 960,342, Kleckner
No. 3,557,756, Ramsey
No. 3,919,978, Schaefer Bennett, U.S. Pat. No. 3,087,458, discloses an assembly including a plurality of animal cages, each having a front opening door, which are held and stacked by an interlocking framing channel. A drainage system, includes a gutter below the door of each cage is integral with the framing channel.

Connelly, U.S. Pat. No. 3,749,061, discloses a plurality of stackable cages each having an air permeable door and an open portion in the upper rear section. The main body portion of the cages rest within an enclosed area having a fan for drawing circulating air through the cages.

Hone, U.S. Pat. No. 4,002,385, discloses a cabinet containing a double pull drawer which is openable from either side of the cabinet.

Kleckner, U.S. Pat. No. 960,342, discloses a hat display and stock cabinet which is divided into a multiplicity of vertically spaced drawer compartments. Each compartment includes a plurality of horizontally aligned drawers which can be drawn in either direction.

Palencia, U.S. Pat. No. 3,225,738, discloses a movable cage support having a generally upright frame supported by casters. Each cage includes a removable tray mounted below a perforate floor section. Studs, extending from the upright frame, engage support means in the form of keyhole apertures in the rear wall of each cage.

Ramsey, U.S. Pat. No. 3,557,756, discloses a shipping container having a plurality of isolated cells. Air, moved by a blower, is passed through a filter and subsequently to each cell. The air is also passed through a thermostatically controlled heating element.

Sachs, U.S. Pat. No. 3,550,558, discloses a multicage construction including a plurality of cage units each having a vertical stack of individual cages. Each unit includes a base tray having front and rear pan which slope downwardly to a drain bowl and an interchangeable intermediate door to provide different cage areas.

Schaefer, U.S. Pat. No. 3,919,978, discloses a frame structure for holding a plurality of kennel units. The rear wall of each kennel unit is apertured to receive an exhaust register assembly which is part of a duct system for exhausting odors to the atmosphere.

Torrey et al, U.S. Pat. No. 3,237,599, discloses an animal care case having a plurality of vertically spaced perforate shelves. A blower on the upper portion of the unit draws air through a grille in the lower portion of the unit and upwardly through the several chambers formed by the shelves. An electric heater controlled by a thermostat is mounted within the air inlet.

While accommodating the confinement of small animals and being considerate of sanitation, the prior art has tended to provide relatively complex expensive structures and has neither recognized nor provided an entirely adequate solution for certain needs. For example, in veterinary medicine facilities ease of reception of the animal and the ready availability to the treatment area are of major significance. Lack of such accommodation imposes undue burdens of time and effort upon veterinary personnel. A further consideration, heretofore apparently ignored, is the unique requirements associated with reduced budget type medical centers.

It would be highly advantageous, therefore, to remedy the deficiencies associated with the prior art.

Accordingly, it is an object of the present invention to provide an improved structure for the temporary confinement of small animals.

Another object of the invention is the provision of an animal holding structure especially adapted for use in veterinarian medical facilities.

And another object of this invention is to provide an animal holding structure which will readily accommodate the transfer between the pet and the pet owner.

Still another object of the invention is the provision of a structure which will hold the animal in readiness for the veterinarian.

Yet another object of the invention is the provision of a structure capable of holding a plurality of animals in isolation one from the other.

And still another object of the invention is to provide a structure that is easily and readily cleansed and sanitized as necessary.

And a further object of the invention is the provision of a relatively inexpensive uncomplicated animal holding structure.

Still a further object of this invention is to provide a structure requiring minimal floor space.

Yet a further object of the invention is the provision of animal holding means which can function as an element of the building structure of the veterinary facility.

And still a further object of the invention is to provide an animal holding structure of the above type which can be fabricated of conventional commercially available material either as a permanent structure or as a modular unit.

Briefly, to achieve the desired object of the instant invention in accordance with a preferred embodiment thereof, first provided is a pair of spaced apart upright panels. A plurality of enclosures, each having open ends, extend between the panels. A plurality of openings extend through the panels, one opening communicating with a respective end of each enclosure. A closure member for selectively closing each opening is carried by the respective panel.

Preferably, each enclosure is in the form of a cylindrical tubular member having a smooth fluid impervious inner surface.

In a further embodiment, the panels extend from one of the pair of spaced apart side walls of a building structure. Each panel includes an outer surface directed toward and spaced from a respective end wall of the building structure. The panels thereby form a partition dividing the building structure into a reception area adjacent one of the end walls and a treatment area adjacent the other of the end walls. A passageway residing between the free end of the partition and the other side wall of the building structure communicates between the reception area and the treatment area.

Further and more specific objects and advantages of the instant invention will become readily apparent to those skilled in the art from the following detailed description of preferred embodiments thereof taken in conjunction with the drawings, in which.

Figure 1:
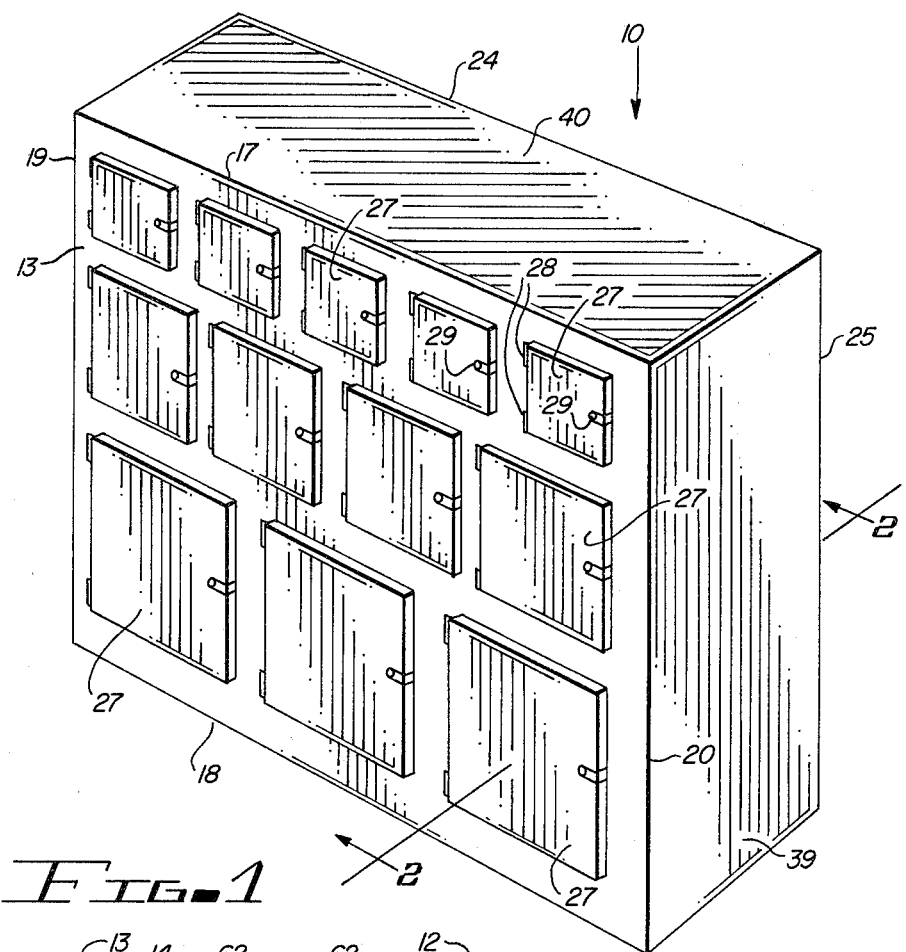
FIG. 1 is a perspective view of an improved animal holding structure constructed in accordance with the teachings of the instant invention.
Figure 2:
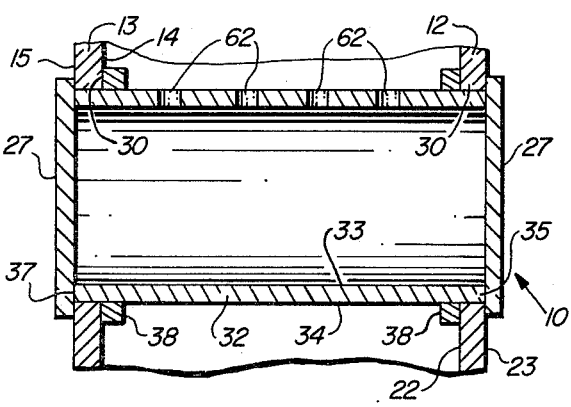
FIG. 2 is an enlarged fragmentary vertical sectional view taken along the line 2—2 of FIG. 1.

Turning now to the drawings in which like reference numerals indicate corresponding elements throughout the several views, attention is first directed to FIGS. 1 and 2 which illustrate an animal holding structure, generally designated by the reference character 10, and including first and second spaced apart upright panels 12 and 13, respectively. Second panel 13 includes inner surface 14, outer surface 15, upper horizontal edge 17, lower horizontal edge 18 and first and second vertical edges 19 and 20, respectively. Similarly, first panel 12 includes inner surface 22, outer surface 23, upper horizontal edge 24 and second vertical edge 25. That is to be understood that first panel 12 further includes, although not specifically illustrated, a lower horizontal edge and a first vertical edge corresponding to the lower horizontal edge and to the first vertical edge, respectively, of second panel 13.

A plurality of closure members are carried by second panel 13. Each closure member includes a door 27, hinges 28 and catch 29. Hinges 28 hingedly affix the door 27 to outer surface 15. Catch 29 selectively retains door 27 in a closed position against outer surface 15. A corresponding plurality of closure elements are carried by first panel 12. Each closure element carried by first panel 12 is aligned with a corresponding closure element carried by second panel 13.

Each door 27 covers an opening 30 within the respective panel. A plurality of enclosures extend between panels 12 and 13. Each enclosure is aligned with a respective pair of corresponding openings 30. Each enclosure is in the form of a tubular member 32, a right circular cylinder, having inner surface 33, outer surface 34 and first and second open ends 35 and 37, respectively. In accordance with the embodiment chosen for purposes of illustration, in which tubular member 32 is specifically illustrated as being cylindrical, first open end 35 is received within opening 30 within first panel 12 while second open end 37 is received within opening 30 within second panel 13. The attachment of tubular member 32 to the panels 12 and 13 is reinforced by collars 38 which encircle tubular member 32 and are secured to the panels 12 and 13 by screws, glue or other suitable conventional means.

In accordance with an alternately preferred embodiment of the instant invention, the open ends of tubular member 32 abut the inner surfaces of the respective panels and the openings 30 correspond to the size and shape of the inner surface 33. Preferably, the inner surface 33 of each tubular element 32 is smooth and fluid impervious for purposes of cleansing and sanitation. It has been determined that enclosures fabricated of commercially available polyvinyl chloride pipe is suitable for this purpose. Similarly, the other components of the structure are also easily fabricated of commercially available material. For example, panels 12 and 13, as well as end panel 39 and top panel 40 extending therebetween may be optionally fabricated of wood, such as plywood, or metal or plastic sheet. Doors 27 may also be fabricated of corresponding material.

Figure 3:
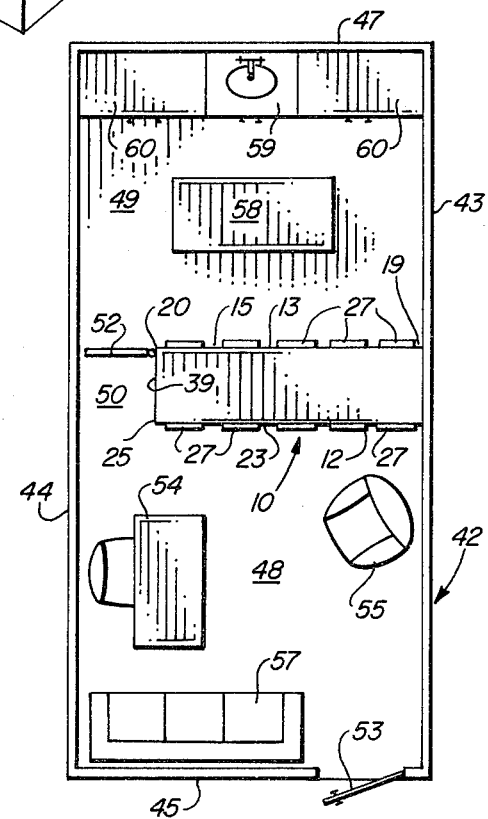
FIG. 3 is a floor plan view of a veterinary medicine facility constructed in accordance with the teachings of the instant invention and incorporating the animal holding structure of FIG. 1.

Attention is now directed to FIG. 3 which shows an improved veterinary medicine facility including building structure, generally designated by the reference character 42 having first and second spaced apart side walls 43 and 44, respectively, and first and second spaced apart end walls 45 and 47, respectively, extending therebetween. Animal holding structure 10 extends from first side wall 43 at a position intermediate end walls 45 and 47. Outer surface 23 of first panel 12 is directed toward first end wall 45 while outer surface 15 of second panel 13 is directed toward second end wall 47. Accordingly, building structure 42 is divided into a reception area 48 adjacent first end wall 45 and a treatment area 49 adjacent second end wall 47. The length of animal holding structure 10 is less than the width between side walls 43 and 44 thereby forming passageway 50 between end panel 39 and side wall 44 which communicates between reception area 48 and treatment area 49. Door 52, including conventional hardware, selectively blocks passageway 50.

While the selection and arrangement of features within the veterinary medicine facility is optional with the user, a preferable arrangement includes entry door 53 located within first end wall 45. A reception desk 54, for use by facility personnel, and a chair 55 and couch 57, for use by pet owners, are located within reception area 48. Treatment area 49 includes treatment table 58, lavatory facilities 59 and storage cabinets 60.

The structure illustrated in FIG. 3 provides a relatively inexpensive yet highly efficient veterinary medicine facility. Persons or owners with pets to be treated or examined enter through door 53 into reception area 48. After registering or consulting with a facility attendent stationed at desk 54, the owner places the pet within a selected tubular member 33 through the corresponding door 27 within first panel 12. When ready, the veterinarian receives the animal through the corresponding door 27 within second panel 13. After examination, treatment or surgery, the animal is returned to the designated enclosure for observation, retention for further treatment, or subsequent pick-up by the owner. It is also within the scope of the instant invention that area 49 may be reserved for extensive treatment or surgery and accommodations for examination or first-aid may reside within area 48, preferably in close proximity to structure 10.

Figure 4:
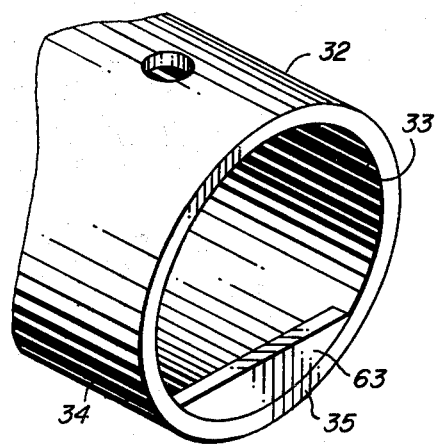
FIG. 4 is an enlarged fragmentary perspective view of the tubular element illustrated in FIG. 2 and showing a further embodiment thereof.

Animals discharge various liquids. In accordance with natural body functions, a healthy dog periodically discharges urine. Various illnesses may cause diarrhea or vomiting. FIG. 4 illustrates a dam 63 positioned proximate the first open end 35 of tubular element 32. Although not specifically illustrated, another dam 63 is positioned at the second end 37 of tubular member 32. Dams 63, extending upwardly from the nethermost portion of tubular element 32, retain liquids within tubular element 32 for clean-up by an attendant. This prevents the unsightly and unsanitary condition of having the fluids drain downwardly over the outer surfaces of panels 12 and 13 and possibly into other enclosures.

Figure 5:
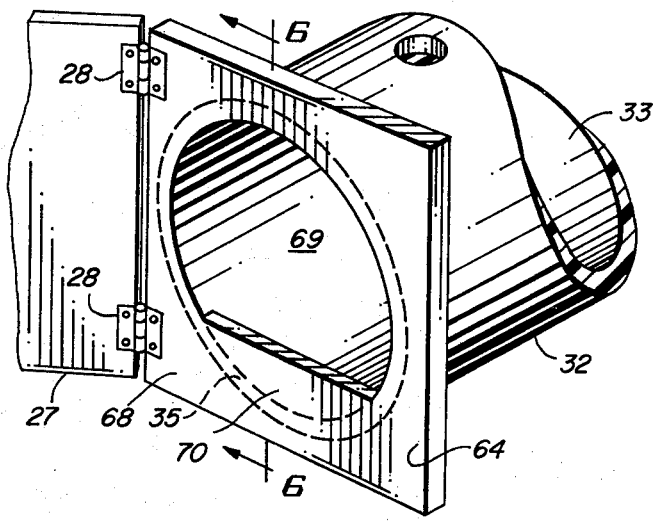
FIG. 5 is a view generally corresponding to the view of FIG. 4 and showing another alternate embodiment thereof.
Figure 6:
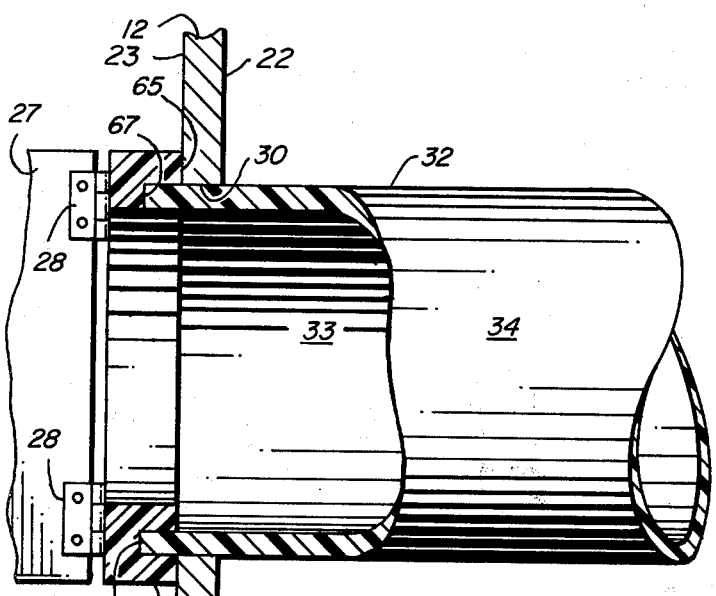
FIG. 6 is a vertical sectional view taken along the line 6—6 of FIG. 5.

FIGS. 5 and 6 illustrate alternate attachment means for securing the several tubular elements 32 to the panels 12 and 13. In the following description, first panel 12 and first end 35 of tubular member 32 have been chosen for purposes of illustration. It will be appreciated that the description is also common to the second end 37 of tubular element 32 and second panel 13.

Plate 64, which may be fabricated of metal, plastic or other suitable material, is positioned with rear face 65 adjacent outer surface 23 of panel 12. End 35 of tubular element 32 projects through opening 30 in panel 12 and into endless groove 67 in rear face 65 of plate 64. Plate 64 may be secured to panel 12 by suitable mechanical fasteners such as screws or, alternately, face 65 may be bonded to surface 23 by an appropriate adhesive. Similarly, tubular member 32 may be affixed within opening 30 and groove 67 by a selected adhesive.

Previously described hinges 28 may be secured directly to plate 64. In the closed position, door 27 abuts the front face 68 of plate 64.

An opening 69, generally sized and shaped to correspond with the cross-sectional size and shape of inner surface 33, extends through plate 64. Opening 69 is truncated at the nethermost portion to provide integral dam 70 for purposes previously described.

Figure 7:
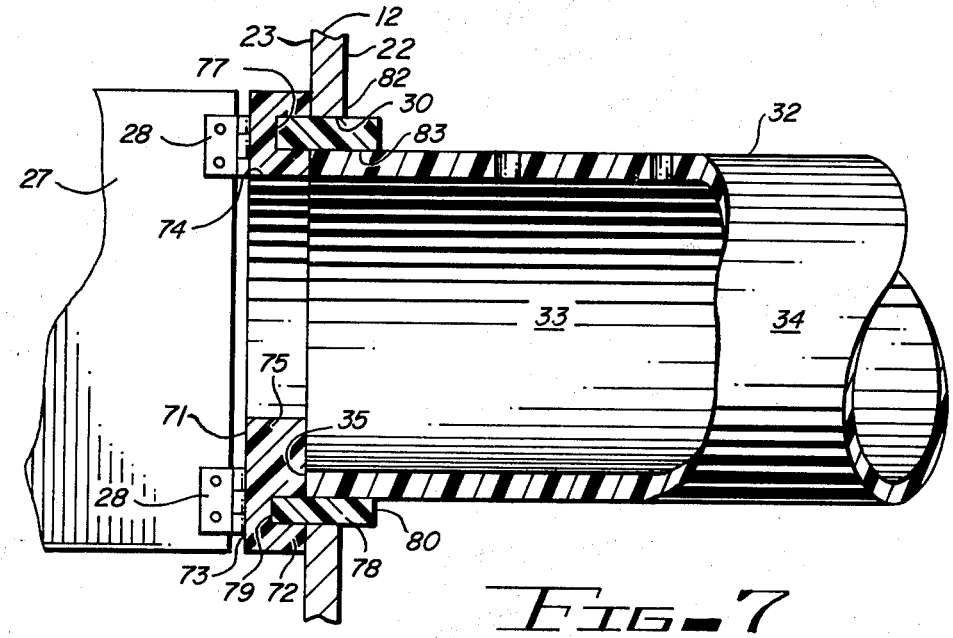
FIG. 7 is a view generally corresponding to the illustration of FIG. 6 and showing yet another embodiment thereof.

FIG. 7 illustrates an alternate means for securing tubular member 32 to a plate such as previously designated by the reference character 64. Modified plate 71, of the instant illustration, in general similarity to plate 64 includes rear face 72, adjacent surface 23, front face 73 having hinges 28 affixed thereto, and opening 74 having integral dam 75. Endless groove 77 is formed in rear face 72 at a distance from opening 74 approximately corresponding to the wall thickness of tubular member 32. Collar 78 projects through opening 30 having a first end 79 held within endless groove 77 and a second end 80 directed toward second panel 13. For this purpose, opening 30 is enlarged to receive outer surface 82 of collar 78. Inner surface 83 telescopingly receives end 35 of tubular element 32. Various means well known to those skilled in the art, as noted in connection with the description of FIG. 6, may be employed for holding the assembly together.

Accordingly, it is immediately apparent that a minimum of extraneous handling of the pet is involved, and that the pet is immediately available to the owner and to the veterinarian. To accommodate various sized animals, it is preferred that the enclosures be of various sizes such as indicated in FIG. 1 where smaller enclosures are located in an upper row with larger and still larger enclosures being located at intermediate and lower rows, respectively. The exact number and size of enclosures are dependent upon the immediate needs of the facility.

It is within the scope of the invention that top panel 40 be eliminated and panels 12 and 13 extend to the ceiling of the facility. Alternate openings, such as openings 62 extending through tubular member 32 as seen in FIG. 2, may extend through doors 27. Further, the animal holding structure may have air vents through the doors and the tubular element to cooperate with an exhaust fan located above the structure for drawing fresh air through each enclosure.

Various other changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the invention, and alternately preferred embodiments thereof, in such clear and concise terms as to enable those skilled in the art to understand and practice the same, the invention claimed is:

1. In a veterinary medicine facility especially adapted for treatment of small animals and including
   first and second spaced apart side walls,
   first and second spaced apart end walls extending between said side walls,
   a reception area proximate said first end wall, and
   a treatment area proximate said second end wall,
improvements therein for dividing said reception area from said treatment area and for receiving said small animals from said reception area, holding said animals, and availing said animals to said treatment area, said improvements comprising:
   a. first and second spaced apart upright panels intermediate said end walls,
      said first panel having an outer surface directed toward said first end wall, and
      said second panel having an outer surface directed toward said second end wall;
   b. a plurality of right circular cylindrical enclosures mounted horizontally and each having a first open end adjacent said first panel and a second open end adjacent said second panel and an inner surface therebetween,
   c. a plurality of first openings extending through said first panel, one for each enclosure, and communicating with the first open end of each of said enclosures;
   d. a plurality of second openings extending through said second panel, one for each enclosure, and communicating with the second open end of each of said enclosures;
   e. a plurality of first closure members for selectively closing each of said first openings; and f. a plurality of second closure members for selectively closing each of said second openings.

2. The improvements of claim 1, further including a dam proximate the first and second open ends of each of said enclosures for retaining liquids within each of said enclosures.

3. The improvements of claim 1 wherein each of said cylindrical enclosures further includes a smooth fluid impervious inner surface.

4. The improvements of claim 3, wherein each of said enclosures is fabricated of a thermoplastic synthetic resin.

5. The improvements of claim 4, further including an air vent extending upwardly through each of said cylindrical enclosures.

6. The improvements of claim 5, further including:
 a. a plurality of first plates each of said first plates having,
  i. a rear face adjacent the outer surface of said first panel,
  ii. a front face, and
  iii. an opening therethrough communicating with a cylindrical enclosure;
 b. a plurality of first attachment means each of said first attachment means securing a first plate to a first open end of a cylindrical enclosure;
 c. a plurality of second plates each of said second plates having,
  i. a rear face adjacent the outer surface of said second panel,
  ii. a front face, and
  iii. an opening therethrough communicating with a cylindrical enclosure; and
 d. a plurality of second attachment means each of said second attachment means securing a second plate to a second open end of a cylindrical enclosure.

7. The improvements of claim 6, wherein:
 a. each of said first attachment means includes an endless groove in the rear face of a first plate for receiving a first end of a cylindrical enclosure therein; and
 b. each of said second attachment means includes an endless groove in the rear face of a second plate for receiving a second end of a cylindrical enclosure therein.

8. The improvements of claim 6, wherein:
 a. each of said first attachment means includes a first collar projecting from the rear face of a first plate through a first opening and telescopingly receiving a first end of a cylindrical enclosure; and
 b. each of said second attachment means includes a second collar projecting from the rear face of a second plate through a second opening and telescopingly receiving a second end of a cylindrical enclosure.

9. The improvements of claim 6, wherein:
 a. each of said first closure members includes a first door hingedly affixed to a first plate; and
 b. each of said second closure members includes a second door hingedly affixed to a second plate.

10. The improvements of claim 6, wherein the opening in each of said plates is sized and shaped to generally correspond to the cross-sectioned size and shape of a cylindrical enclosure and is truncated proximate the nethermost portion to provide an integral dam for the retention of liquids within a cylindrical enclosure.

11. The improvements of claim 1 wherein:
 a. the first open end of each of said cylindrical enclosures resides within a first opening; and
 b. the second open end of each of the cylindrical enclosures resides within a second opening.

12. The improvements of claim 1, wherein:
 a. each of said first closure members includes
  i. a door hingedly affixed to said first panel; and
  ii. a catch for selectively retaining said door in a closed position against the outer surface of said first panel; and
 b. each of said second closure members includes,
  i. a door hingedly affixed to said second panel; and
  ii. a catch for selectively retaining said door in a closed position against the door surface of said second panel.

13. An improved veterinary medicine facility especially adapted for the treatment of small animals, said facility comprising:
 a. a building structure including,
  i. first and second spaced apart side walls, and
  ii. first and second spaced apart end walls;
 b. a partition intermediate said first and said second end walls including
  i. first and second spaced apart panels
   said first panel having an outer surface directed toward said first end wall,
   said second panel having an outer surface directed toward said second end wall,
  ii. a plurality of tubular enclosures having a first open end adjacent said first panel and a second open end adjacent said second panel,
  iii. a plurality of first openings extending through said first panel and communicating with the first open end of an enclosure,
  iv. a plurality of second openings extending through said second panel and communicating with the second open end of an enclosure,
  v. a plurality of first closure members for selectively closing each of said first openings; and
  vi. a plurality of second closure members for selectively closing each of said second openings;
   said partition dividing said building structure into a reception area adjacent said first end wall and a treatment area adjacent said second end wall.

14. The improved veterinary medicine facility of claim 13, further including a passageway residing between said partition and said second side wall and communicating between said reception area and said treatment area.

15. The improved veterinary medicine facility of claim 14, further including door means for selectively blocking said passageway.

* * * * *